G. B. HAKINS.
DENTAL CLEANING DEVICE.
APPLICATION FILED MAR. 26, 1908.

981,638.  Patented Jan. 17, 1911.

Witnesses  Inventor
  George B. Hakins
  by R. H. Puess  Attorney

UNITED STATES PATENT OFFICE.

GEORGE B. HAKINS, OF NORWOOD, NEW YORK.

DENTAL CLEANING DEVICE.

981,638.  Specification of Letters Patent.  Patented Jan. 17, 1911.

Application filed March 26, 1908. Serial No. 423,432.

*To all whom it may concern:*

Be it known that I, GEORGE B. HAKINS, a citizen of the United States, residing at Norwood, in the county of St. Lawrence and State of New York, have invented certain new and useful Improvements in Dental Cleaning Devices, of which the following is a specification.

This invention pertains to certain new and useful improvements in dental cleaning devices, and has for its object to provide a simple, compact, efficient and practicable device which includes sponge rubber as the cleaning medium.

Sponge rubber is possessed of certain peculiar characteristics which especially adapt it for cleaning purposes, of which may be cited its extremely soft properties which permit it, though driven at a high rate of speed, to come into contact with the gum or related parts of the mouth without perceptible pain or the slightest injury to the patient. Again its cleansing value is of high order and due to its great degree of compressibility it may with comparative slight pressure be brought to enter in the space between the teeth and at the juncture of the teeth with the gums to an extent impossible with the usual and well known hard rubber disks, or similar devices.

Figure 1:
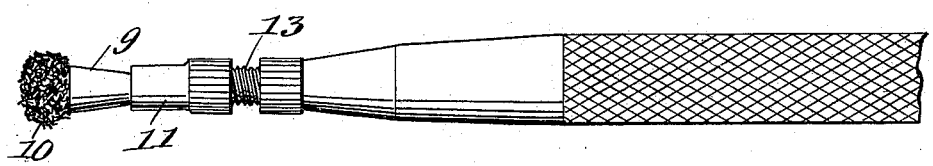
Figure 2:
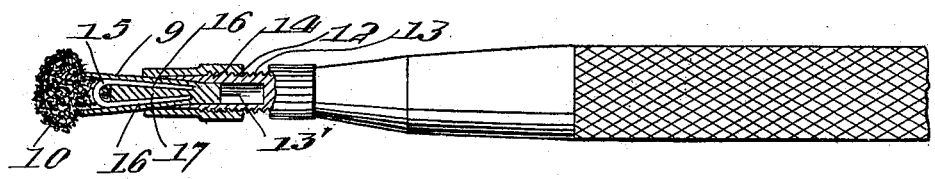

In the accompanying drawings:—Figure 1 is a side elevation of the invention, and Fig. 2 is a view similar to Fig. 1, but illustrating the means for securing the sponge rubber, in sections.

The invention as at present contemplated includes an exteriorly threaded sleeve 13 which is split as indicated at 13′, and is formed at its free end with an inclined portion 14.

9 designates a conical hollow element which at its large outer end forms a compression chamber.

The mass of sponge rubber denoted 10, has passed therethrough the securing element 15 of staple-form or U-shape, the legs 16 of which are brought to lie close to each other and are rigidly secured to element 9, by a body 17, which may be of wood, or a binding cement or other suitable holding material or agent. Body 17 in this instance forms the bottom of the compression chamber. A securing sleeve 12, is threaded to engage the threads of sleeve 13, and has its inner face between its ends formed inclined to ride incline of sleeve 13, whereby when sleeve 13 is rotated so as to advance toward the front end of sleeve 9, the inclined portion 14 coming in intimate contact with the inclined part of sleeve 12, will cause sleeve 13, due to its being split to tightly clamp element 9.

It may be mentioned that a further contemplated use to which the invention is put, is that of cleaning and polishing finger nails.

What I claim is:—

1. A dental cleaning device, comprising, in combination, a cup-shaped element, an elongated tubular sleeve adapted to receive said cup-shaped element, a member threaded on said sleeve and partially telescoping said cup-shaped element to clamp the latter in said sleeve, a mass of sponge rubber contained in said cup-shaped element, and a clamping head comprising a looped element entered through said rubber and clamped in said cup-shaped element.

2. A dental cleaning device comprising in combination with a mass of sponge rubber, a cup-shaped element, and a clamping head, comprising a looped band having a wedge between the legs of said loop whereby said loop is secured in the bottom of said cup, said loop being surrounded by and compressing a portion of said rubber in the bottom of said cup, to form a bed or resilient base for the remaining portion of said rubber.

In testimony whereof I affix my signature, in presence of two witnesses.

GEORGE B. HAKINS.

Witnesses:
 WILLIS J. FLETCHER,
 MAGGIE SAELLIEU.